(12) United States Patent
Jacobs

(10) Patent No.: US 6,360,139 B1
(45) Date of Patent: **\*Mar. 19, 2002**

(54) METHOD AND SYSTEM FOR VENDING PRODUCTS

(75) Inventor: Herbert H. Jacobs, LaJolla, CA (US)

(73) Assignee: American Greetings Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/211,271

(22) Filed: Dec. 14, 1998

Related U.S. Application Data

(63) Continuation of application No. 08/475,588, filed on Jun. 7, 1995, now Pat. No. 5,875,110.

(51) Int. Cl.[7] .............................................. G06F 17/00
(52) U.S. Cl. ........................ 700/232; 700/216; 707/5; 235/381
(58) Field of Search ........................... 700/90, 95, 104, 700/231, 233, 240, 106; 235/381; 704/10; 707/5, 532, 533

(56) References Cited

U.S. PATENT DOCUMENTS

| | | | | |
|---|---|---|---|---|
| 4,384,329 A | * | 5/1983 | Rosenbaum et al. | 704/10 |
| 5,321,833 A | * | 6/1994 | Chang et al. | 707/5 |
| 5,552,994 A | * | 9/1996 | Cannon et al. | 700/95 |
| 5,875,110 A | * | 2/1999 | Jacobs | 700/232 |

\* cited by examiner

*Primary Examiner*—William Grant
*Assistant Examiner*—Sheela S. Rao
(74) *Attorney, Agent, or Firm*—Jones, Day, Reavis & Pogue

(57) ABSTRACT

The present invention provides a method and system for vending products where the customer is guided through an interactive process that receives selection criteria from the customer relating to the type of product the customer would like to purchase and uses the customer's selection criteria to determine which products are potentially suitable for the customer's purposes, needs, interests, and tastes and to rank the products based on their suitability to facilitate the customer's final selection of a product. The system includes a computer that is provided with a storage device associated therewith. Products to be vended or data relating to products to be vended are stored in the storage device. The computer is also connected to an input/output ("I/O") device, a payment device, and a manufacturing device. The storage device, the I/O device, the payment device, and the manufacturing device are connected to the computer by means of data transmission media or data communication systems. Initially, the I/O device prompts a customer for selection criteria relating to the type of product the customer would like to purchase and then inputs the customer's selection criteria. After receiving the customer's selection criteria, the computer uses the criteria to determine which products are potentially suitable for the customer's purposes, needs, interests, and tastes and to rank the products based on their suitability. Next, the I/O device displays a list of the ranked products for the customer, prompts the customer to make a final selection of a product, and inputs the customer's final selection.

30 Claims, 16 Drawing Sheets

PRODUCT DATA FILE

| GREETING CARD aa | GREETING CARD ab | GREETING CARD ac | ... | GREETING CARD zy | GREETING CARD zz |
|---|---|---|---|---|---|

*Fig. 3*

PRODUCT SUITABILITY DATA FILE

| PRODUCT SUITABILITY MATRIX aa | PRODUCT SUITABILITY MATRIX ab | PRODUCT SUITABILITY MATRIX ac | ... | PRODUCT SUITABILITY MATRIX zy | PRODUCT SUITABILITY MATRIX zz |
|---|---|---|---|---|---|

*Fig. 4*

PRODUCT SUITABILITY MATRIX

| APPLIC. MOD.\ CAT. CAT. | OCCASION | RELATIONSHIP | AGE | GENDER | STYLE |
|---|---|---|---|---|---|
| UNMODIFIED | | | | | |
| COMPUTER FILL-IN | | | APPLICATION DESCRIPTORS | | |
| COMPUTER BLANKED | | | | | |
| CUSTOMER FILL-IN | | | | | |

*Fig. 5*

PRODUCT SUITABILITY MATRIX ⟵ 52

| APPLIC. MOD. CAT. \ CAT. | OCCASION | RELATIONSHIP | AGE | GENDER | STYLE |
|---|---|---|---|---|---|
| UNMODIFIED | FRIENDSHIP THINKING OF YOU MISSING YOU | FRIEND LOVER | ADULT | EITHER | HUMOROUS CUTE WARM |
| COMPUTER FILL-IN | SWEETEST DAY CHEER | SAME AS UNMODIFIED | SAME AS UNMODIFIED | SAME AS UNMODIFIED | SAME AS UNMODIFIED |
| COMPUTER BLANKED | ANY | ANY | ANY | SAME AS UNMODIFIED | SAME AS UNMODIFIED |
| CUSTOMER FILL-IN | ANY | SPECIFIC RECIPIENT | SAME AS UNMODIFIED | SAME AS UNMODIFIED | SAME AS UNMODIFIED |

*Fig. 6*

PRODUCT SUITABILITY MATRIX

| APPLIC. MOD. CAT. \ CAT. | OCCASION | RELATIONSHIP | AGE | GENDER | STYLE |
|---|---|---|---|---|---|
| UNMODIFIED | BIRTHDAY | ANY | INFANT | MALE | ANY |
| COMPUTER FILL-IN | NONE | NONE | NONE | NONE | NONE |
| COMPUTER BLANKED | NONE | NONE | NONE | NONE | NONE |
| CUSTOMER FILL-IN | NONE | NONE | NONE | NONE | NONE |

Fig. 7

PRODUCT SUITABILITY MATRIX

| APPLIC. MOD. \ CAT. CAT. | OCCASION | RELATIONSHIP | AGE | GENDER | STYLE |
|---|---|---|---|---|---|
| UNMODIFIED | ANNIVERSARY VALENTINE'S DAY MOTHER'S DAY | MOTHER GRANDMOTHER WIFE | ADULT | FEMALE | SENTIMENTAL TRADITIONAL POETIC |
| COMPUTER FILL-IN | SAME AS UNMODIFIED | DEAREST ONE ONE I LOVE | SAME AS UNMODIFIED | SAME AS UNMODIFIED | SAME AS UNMODIFIED |
| COMPUTER BLANKED | NONE | NONE | NONE | NONE | NONE |
| CUSTOMER FILL-IN | SAME AS UNMODIFIED | SPECIFIC RECIPIENT | SAME AS UNMODIFIED | SAME AS UNMODIFIED | SAME AS UNMODIFIED |

PLEASE TOUCH SCREEN TO SELECT
OCCASION OR PURPOSE FOR GREETING CARD

| BIRTHDAY | WEDDING | ANNIVERSARY |
| HOLIDAY | GET WELL | SYMPATHY |
| | CONGRATS | GOOD LUCK |

Fig. 10

PLEASE TOUCH SCREEN TO SELECT
RELATIONSHIP OF RECIPIENT TO YOU

RELATIVE      FRIEND      CO-WORKER

Fig. 11

PLEASE TOUCH SCREEN TO SELECT
AGE OF RECIPIENT

INFANT      JUVENILE      ADULT

Fig. 12

PLEASE TOUCH SCREEN TO SELECT
GENDER OF RECIPIENT

MALE      FEMALE

Fig. 13

PLEASE TOUCH SCREEN TO SELECT
STYLE OF MESSAGE

ROMANTIC    SENTIMENTAL

HUMOROUS    SARCASTIC

*Fig. 14*

PLEASE TOUCH SCREEN TO SELECT
A PARTICULAR HOLIDAY

| NEW YEAR | EASTER | PASSOVER |
| --- | --- | --- |
| MOTHER'S DAY | FATHER'S DAY | HALLOWEEN |
| THANKSGIVING | CHRISTMAS | HANUKKAH |

*Fig. 15*

PLEASE TOUCH SCREEN TO SELECT
A PARTICULAR TYPE OF RELATIVE

| PARENT | SIBLING | SPOUSE |
| --- | --- | --- |
| GRANDPARENT | AUNT | UNCLE |
| COUSIN | NIECE | NEPHEW |

*Fig. 16*

PLEASE TOUCH SCREEN TO SELECT
A PARTICULAR PARENT

MOTHER    FATHER

*Fig. 17*

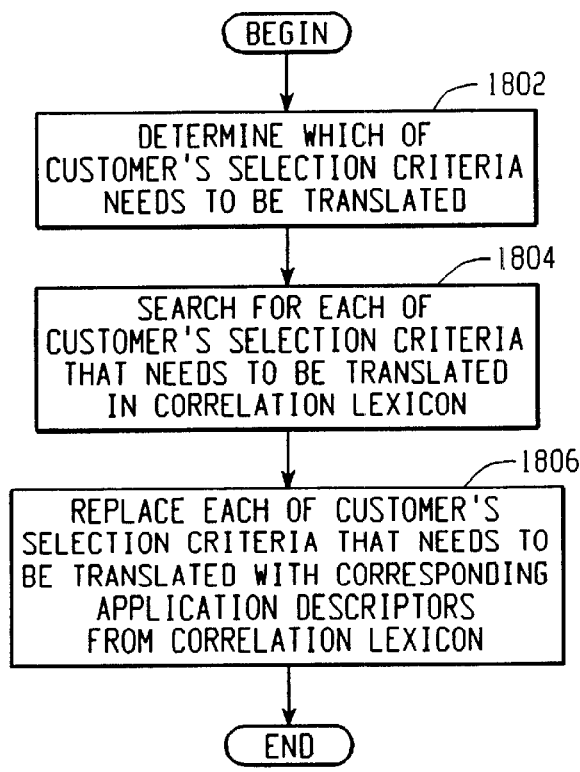

CORRELATION LEXICON

| CUSTOMER'S SELECTION CRITERIA | APPLICATION DESCRIPTORS |
|---|---|
| MALE RELATIVE | SON, FATHER, BROTHER, GRANDFATHER, UNCLE |
| ROMANTIC | SEXUAL, PASSIONATE, TENDER |
| CONGRATULATIONS | GRADUATION, NEW JOB, NEW HOUSE, PROMOTION |
| GET WELL | FEELING DOWN, SURGERY, SERIOUS ILLNESS |
| ANNIVERSARY | FIRST, SILVER, GOLD |
| JUVENILE | TODDLER, PRE-TEEN, TEENAGER |
| HUMOROUS | FUNNY, WITTY, DROLL |
| FEMALE RELATIVE | DAUGHTER, MOTHER, AUNT, SISTER, GRANDMOTHER |

PLEASE TOUCH SCREEN TO SELECT
IMPORTANCE OF EACH CATEGORY
IN DETERMINING SUITABILITY
OF GREETING CARDS FOR YOU (1 IS VERY IMPORTANT
AND 5 IS NOT IMPORTANT)

| | | | | | |
|---|---|---|---|---|---|
| OCCASION | 1 | 2 | 3 | 4 | 5 |
| RELATIONSHIP | 1 | 2 | 3 | 4 | 5 |
| AGE | 1 | 2 | 3 | 4 | 5 |
| GENDER | 1 | 2 | 3 | 4 | 5 |
| STYLE | 1 | 2 | 3 | 4 | 5 |

*Fig. 23*

METHOD AND SYSTEM FOR VENDING PRODUCTS

RELATED APPLICATIONS

That application is a continuation of application Ser. No. 08/475,588 filed on Jun. 7, 1995, now U.S. Pat. No. 5,875,110.

The following United States patent applications are incorporated herein by reference as if they had been fully set out:

application Ser. No. 08/299,499, filed Sep. 1, 1994, now U.S. Pat. No. 5,726,898, entitled "METHOD AND APPARATUS FOR STORING AND SELECTIVELY RETRIEVING AND DELIVERING PRODUCT DATA BASED ON EMBEDDED EXPERT JUDGEMENTS";

application Ser. No. 08/349,390, filed Dec. 5, 1994, now U.S. Pat. No. 5,550,746, entitled "METHOD AND APPARATUS FOR STORING AND SELECTIVELY RETRIEVING PRODUCT DATA BY CORRELATING CUSTOMER SELECTION CRITERIA WITH OPTIMUM PRODUCT DESIGNS BASED ON EMBEDDED EXPERT JUDGMENTS"; and application Ser. No. 08/455,538, filed May 31, 1995, entitled "METHOD AND APPARATUS FOR STORING AND SELECTIVELY RETRIEVING PRODUCT DATA BASED ON EMBEDDED EXPERT SUITABILITY RATINGS," Express Mail

FIELD OF THE INVENTION

The present invention relates generally to a method and system for vending products and, more particularly, to a method and system for vending products where the customer is guided through an interactive process that receives selection criteria from the customer relating to the type of product the customer would like to purchase and uses the customer's selection criteria to determine which products are potentially suitable for the customer's purposes, needs, interests, and tastes and to rank the products based on their suitability to facilitate the customer's final selection of a product.

BACKGROUND OF THE INVENTION

In a conventional retail, catalogue, or library environment, customers are able to browse quickly and conveniently through large physical displays of products, while they inspect images, read words, listen to music, and/or engage in other reviewing activities, until they find the specific product most suitable for their purposes, needs, interests, or tastes. Typical examples of such environments include greeting card shops and video rental stores. Under these conventional circumstances, customers can and do exercise their discriminating judgments and mental processes to make selections following direct physical surveillance of the products.

Recently, machines and systems have been introduced that replace these large physical product displays by storing data relating to the products in magnetic or optical storage devices. An example of such machines are the social expression product machines which have become popular in recent years because they eliminate many of the problems associated with displaying numerous categories and sub-categories of social expression products. Some of these problems include the space required for displaying such a variety of social expression products, the resulting inventory requirements, and potential customer confusion resulting from the wide variety of social expression products from which to choose. Similarly, large physical displays of products may be replaced by a single central library of products or data relating to the products that can be selected electronically by a remote customer employing interactive means and then transmitted for display. The problem in both such instances is to allow the customer to enter data that enables the system to retrieve products or data relating to the products from a non-visible library which are likely to suit the customer's purposes, needs, interests, or tastes.

Social expression product machines typically comprise a computer operated vending machine, a display screen, and a keyboard input terminal. A variety of available social expression product designs are stored in the computer. By means of the display screen, the computer prompts a customer to provide design criteria, or to select from a menu of computer-provided design criteria, indicative of appropriate social expression product designs for that customer. The keyboard input terminal is used to select or present the design criteria.

The computer uses the provided or selected design criteria to identify appropriate social expression product designs from the variety of available social expression product designs stored therein, generally by techniques which search for and identify those designs whose specified properties are exactly matched to the customer input design criteria. From these identified designs, the customer is directed to select one design, which the computer-driven vending machine prints on blank card stock and dispenses to the customer. In this manner, the customer can retrieve and review portions of the data on a video screen and audio system, by giving instructions on a keyboard or touchscreen that is connected by a programmed computer to the storage devices holding the data.

In simple situations involving such machines, the retrieval of the data is easily managed by conventional methods. For example, in the case of inputting or selecting a title, an object image or a few descriptive words can communicate to a machine all of the information required to specify the data file or files containing information that a customer wants to retrieve and display. Product characteristics are identified by allowable combinations of customer entered data. The computer can be programmed to retrieve the file or files that the user specifies, either by accessing known locations in a data storage device or by searching a database to find the files whose identities match the descriptive words input by the customer. An example of a machine and method that accesses data from known storage locations is shown in U.S. Pat. No. 3,757,037 to Norman Bialek. An example of a machine and method that searches a database to find files whose identities match descriptive words is shown in U.S. Pat. No. 5,056,029 to Thomas G. Cannon.

The Cannon patent discloses a method wherein a customer is queried to elicit responses, in the form of occasion parameters, each of which relates to the customer's intended communication purpose. Social expression cards which may be selected for manufacture are stored, not physically, but in the form of design data held in high density magnetic or optical storage. The design data is identifiable by some unique combination of occasion parameters. Following the entry of customer responses, the computer retrieves and displays a set of card files which includes all of the stored card designs having occasion parameters which identically match those entered by the customer. While the card vending machine shown in the Cannon patent provides an efficient means for storing many different types of social expression cards and for retrieving and displaying those card designs which match a customer's criteria, that machine, as well as other known machines, suffers from several drawbacks.

One drawback is that the present machines can retrieve and display only those card designs that are identified by labels or descriptors that match exactly the criteria specified by the customer. However, some card designs can convey messages so broad in scope that they cannot be defined exclusively with selected descriptors. These designs may be applicable to many kinds of sending situations, especially when they are capable of being modified by the customer. At the same time, other card designs may have descriptors that only correspond partially to a given set of customer criteria but may still be eminently suitable. Because the present card vending machines are limited in that they require an exact match between customer criteria and card descriptors, they cannot use a large database of card designs to its fullest potential in meeting customer needs.

Indeed, the number of card designs that must be stored in the database of one of the presently available machines is extremely large in relation to the number of different combinations of customer needs that it can meet. Because of the exact correspondence that is required between the card descriptors and the customer criteria, the number of stored card designs must be equal to the number of possible combinations of the various criteria that a customer can specify, multiplied by the average number of card designs that a vendor would want to display in response to a particular criteria combination. For instance, if the customer were given five possible criteria options to choose from within each of four card descriptors, 625 (=$5^4$) combinations of customer-selected criteria would be possible. If an average of ten card designs were made available for each combination, then a total of 6,250 card designs would be required in the database.

Another drawback is that such machines restrict the identities of product data files to fixed combinations of customer entry data. Many buyers of products and users of information cannot easily provide the exact word or words necessary for retrieving data either from known storage locations or by database searching. The suitability of products, especially those that have rich aesthetic, intellectual, or entertainment values, often cannot be described by single combinations of descriptive words. Thus, it may be necessary to provide the capability for several different forms or contents of customer entry data to access and retrieve a given product data file. For example, a customer may be able to specify only a few criteria for products that he wants to view, while those products are identified by many descriptive words. In such a case, a customer's specific criteria may be considered as suggestive only and a wide range of product files may be shown to him, some of which have very few, if any, of the exact criteria specified by the customer. As a result, some data files may apply to and ought to be retrievable in response to many different sets of customer purposes, needs, interests, or tastes.

More importantly, on many occasions, a given product design may possess a very high degree of applicability with respect to one selection criterion input by a customer, but lower or very low degrees of applicability with respect to other criteria. On other occasions, a given product design may be highly applicable with respect to selection criteria that really matter to the customer but non-applicable with respect to other criteria that matter little. On still other occasions, the customer may specify a limited set of selection criteria that cannot be matched to any stored product designs because the designs are characterized by a much larger set of descriptors. In the general case where customer inputs comprise multiple selection criteria, the set of criteria will possess varying degrees of correspondence and closeness to the set of descriptors used to describe the properties of the stored product designs. The problem to be solved is to identify for retrieval some subset of designs whose overall suitability is judged to be the best.

In one solution, the product designs may be designated as having varying degrees of applicability or suitability for a particular set of customer criteria, rather than being designated as either suitable or not suitable. In that case, customers may prefer to see product designs of such varying suitability in the order of their anticipated suitabilities, from the highest to the lowest. Conversely, different customers may prefer to see different numbers of product designs having a range of suitabilities. All of the aforementioned circumstances and needs can best be served by a system which, rather than seeking to identify products whose characteristics exactly match customer specifications, embodies one or more kinds of suitability data for the purpose of selectively retrieving some subset of best fitting or most appropriate products or product data files in response to customer data entry.

SUMMARY OF THE INVENTION

The present invention provides a method and system for vending products where the customer is guided through an interactive process that receives selection criteria from the customer relating to the type of product the customer would like to purchase and uses the customer's selection criteria to determine which products are potentially suitable for the customer's purposes, needs, interests, and tastes and to rank the products based on their suitability to facilitate the customer's final selection of a product. The system includes a computer that is provided with a storage device associated therewith. Products to be vended or data relating to products to be vended are stored in the storage device. The computer is also connected to an input/output ("I/O") device, a payment device, and a manufacturing device. The storage device, the I/O device, the payment device, and the manufacturing device are connected to the computer by means of data transmission media or data communication systems.

Initially, the I/O device prompts a customer for selection criteria relating to the type of product the customer would like to purchase and then inputs the customer's selection criteria. After receiving the customer's selection criteria, the computer uses the criteria to determine which products are potentially suitable for the customer's purposes, needs, interests, and tastes and to rank the products based on their suitability. Next, the I/O device displays a list of the ranked products for the customer, prompts the customer to make a final selection of a product, and inputs the customer's final selection.

Once the customer makes a final selection of a product, the I/O device prompts the customer for any desired modifications to the selected product and then inputs the customer's desired modifications, if any. After receiving any desired modifications, the computer modifies the selected product, if necessary. Next, the I/O device prompts the customer for payment for the selected product. The payment device then accepts the customer's payment for the selected product. Upon receipt of the proper payment from the customer, the manufacturing device manufactures the selected product and delivers the product to the customer.

BRIEF DESCRIPTION OF THE DRAWINGS

FIG. 3 is an illustration of an exemplary layout of a product data file shown in FIG. 2A;

FIG. 4 is an illustration of an exemplary layout of a product suitability data file shown in FIG. 2A;

FIG. 5 is an illustration of an exemplary layout of a product suitability matrix included in the product suitability data file shown in FIG. 4;

FIGS. 6–8 are exemplary product suitability matrices having the layout shown in FIG. 5;

FIGS. 10–17 are exemplary menu screens that may be used to prompt a customer interacting with the system of FIG. 1;

FIG. 18 is a flowchart illustrating a translation step of FIGS. 9A and 9B in greater detail;

FIG. 19 is a schematic illustration of a correlation lexicon used in the translation step of FIG. 18;

FIG. 23 is an exemplary menu screen that may be used to prompt a customer for data used in the ranking step of FIG. 22.

DETAILED DESCRIPTION OF THE PREFERRED EMBODIMENT

Figure 1:
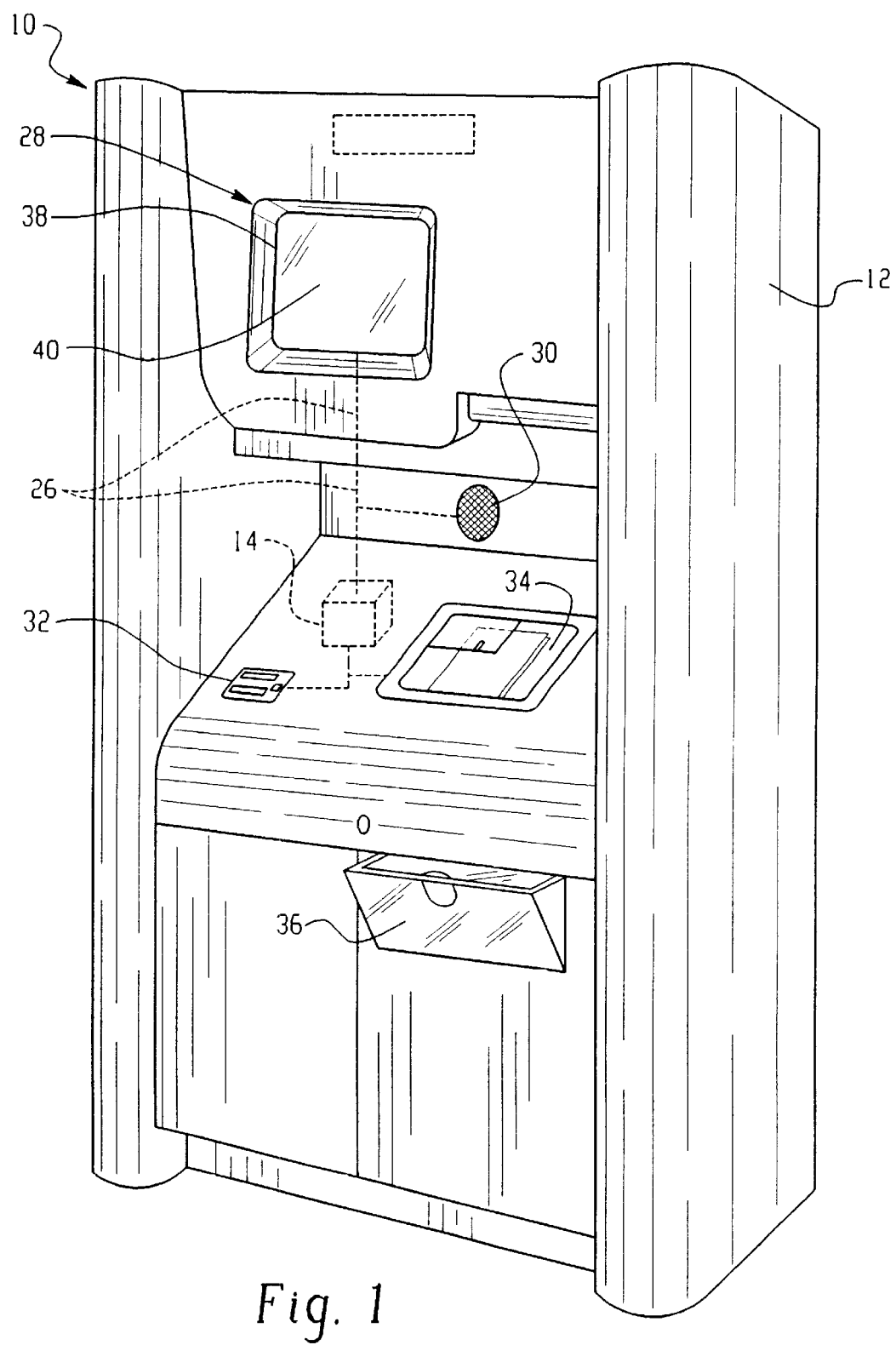
FIG. 1 is a perspective view of one embodiment of a system constructed according to the principles of the present invention.
Figure 2A:
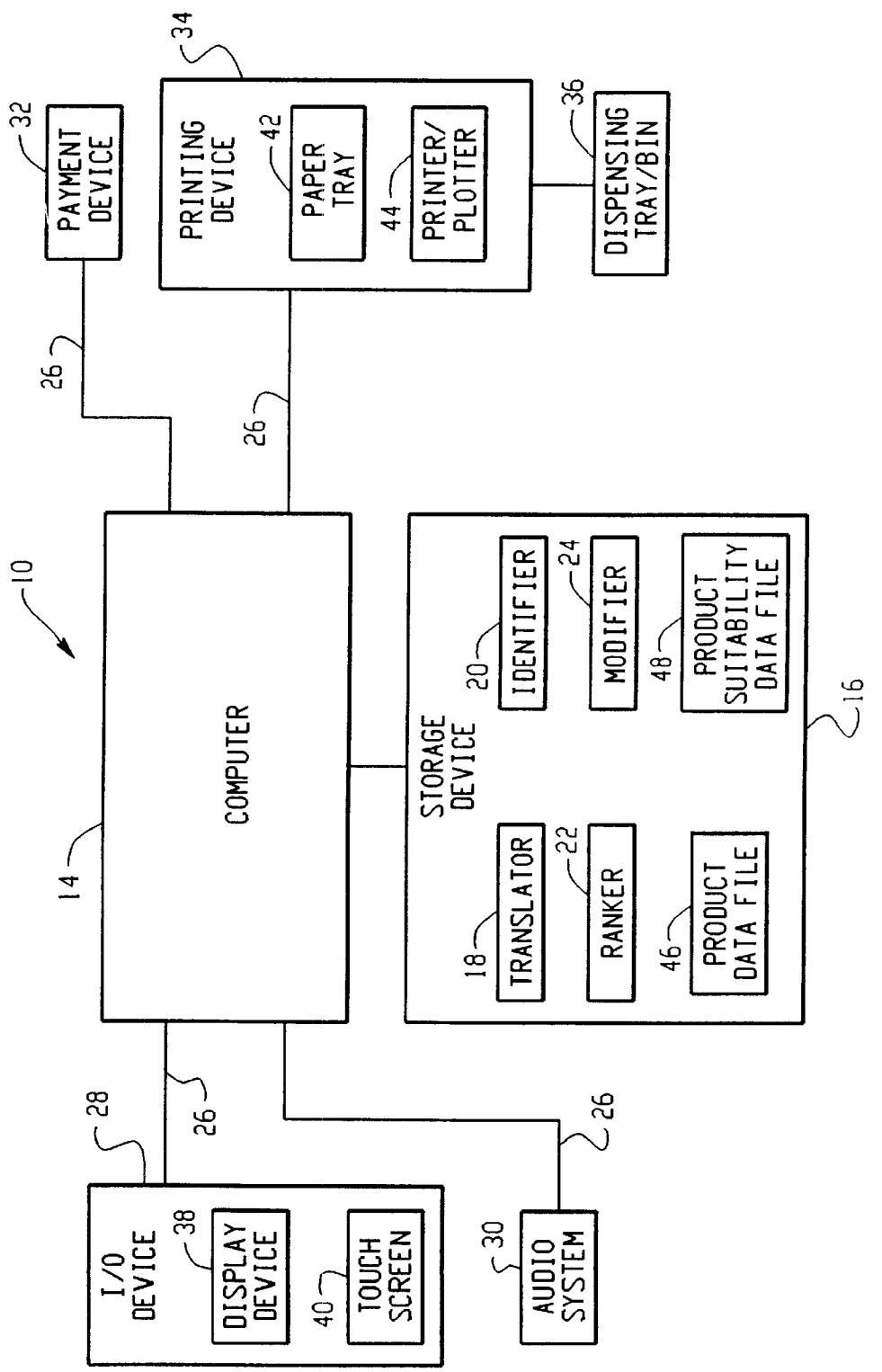
FIG. 2A is a schematic block diagram of the system of FIG. 1.

The preferred embodiment of the present invention provides a method and system for vending products where the customer is guided through an interactive process that receives selection criteria from the customer relating to the type of product the customer would like to purchase and uses the customer's selection criteria to determine which products are potentially suitable for the customer's purposes, needs, interests, and tastes and to rank the products based on their suitability to facilitate the customer's final selection of a product. A system 10 constructed according to the principles of the present invention is shown in FIG. 1. The functional relationship between the components of the system 10 is shown in FIG. 2A. The system 10, which is merely one embodiment constructed according to the principles of the present invention, is used to vend social expression products (e.g., greeting cards). However, one of ordinary skill in the art will appreciate that the principles of the present invention may be applied to other types of systems for vending other types of products and services. For example, the principles of the present invention may be applied to a television system that is used to vend programs and movies by allowing customers to select programs and movies for viewing from their home televisions.

The system 10 is in the form of a kiosk designed for the on-site vending (including storage, retrieval, display, modification, payment, manufacture, and/or delivery) of greeting cards in a retail store or shopping mall concourse. For illustration purposes, the system 10 is shown with all of the components for performing these functions located within a single kiosk. However, all of the components of the system do not have to be located within a single kiosk. One of ordinary skill in the art will appreciate that various components of the system (such as storage devices, I/O devices, payment devices, and printing devices) may be placed at locations remote from the kiosk (such as at other locations within a retail store, at a distant control center, or within a customer's home). For example, in the system 10, the greeting cards are delivered from the kiosk in printed form. However, in an alternative system, the printing of the card designs does not necessarily take place within the kiosk. Instead, the retrieved card design data may be stored on a magnetic disk and the disk delivered to the customer, or the card design data may be sent directly to the customer's home computer, allowing the customer to print the card on the customer's printer or plotter.

A. System Components

Referring in detail to FIGS. 1 and 2A, the system 10 includes an enclosure 12 in which is housed a computer 14. The computer 14 is provided with a storage device 16 associated therewith. A translator 18, an identifier 20, a ranker 22, and a modifier 24 are stored in the storage device 16 for execution by the computer 14. The computer 14 is also electrically connected by means of data transmission media 26 (such as wiring) to an I/O device 28, an audio system 30, a payment device 32, and a printing device 34. The computer 14 controls the operation of the various components of the system 10. Further, the enclosure 12 houses a dispensing tray or bin 36.

Initially, the I/O device 28 prompts a customer for selection criteria relating to the type of greeting card the customer would like to purchase and then inputs the customer's selection criteria. The I/O device 28 preferably includes a display device 38 provided with a touch screen overlay 40. The touch screen overlay 40 is a transparent, pressure sensitive plate that covers the display device 38 and is capable of sensing a location where it is touched by a customer. The display device 38 is used to display the prompts for selection criteria to the customer, and the touch screen overlay 40 is used to input the customer's selection criteria. Alternative forms of input devices are contemplated in place of the touch screen overlay 40. For example, a keyboard, a stylus in combination with a screen which recognizes contact with the stylus, or a mouse may be used. These alternative forms of input devices may also be used in addition to, instead of in place of, the touch screen overlay 40.

The audio system 30 may be used to prompt the customer for selection criteria. The audio system 30 may be used in place of the display device 38, but typically would be used in conjunction with the display device. The audio system 30 may also be used to attract customers to the system 10.

After receiving the customer's selection criteria, the computer 14 (in conjunction with the translator 18, the identifier 20, and the ranker 22) uses the customer's selection criteria to determine which greeting cards are potentially suitable for the customer's purposes, needs, interests, and tastes and to rank the greeting cards based on their suitability. Next, the display device 38 displays a list of the ranked greeting cards for the customer and prompts the customer to make a final selection of a greeting card. The touch screen overlay 40 then inputs the customer's final selection of a greeting card.

Once the customer makes a final selection of a greeting card, the display device 38 prompts the customer for any desired modifications to the selected greeting card, and the touch screen overlay 40 inputs the customer's desired modifications, if any. After receiving any desired modifications, the computer 14 (in conjunction with the modifier 24) modifies the selected greeting card, if necessary.

Next, the display device 38 prompts the customer for payment for the selected greeting card. The payment device 32 then accepts the customer's payment for the selected greeting card. The computer 14 instructs the payment device 32 regarding the amount of the payment to collect from the customer. The payment device 32 prevents the printing device 34 from operating until the payment device has received the proper payment from the customer. The payment device 32 may include a coin acceptor, a bill acceptor, and/or a credit card acceptor.

Upon receipt of the proper payment from the customer, the printing device 34 prints the selected greeting card. The printing device 34 preferably includes a paper tray 42 and a printer or plotter 44. The paper tray 42 is used to supply paper to the printer or plotter 44, and the printer or plotter is used to print the selected greeting card. After printing the selected greeting card, the printer or plotter 44 deposits the printed greeting card in the dispensing tray or bin 36 for delivery to the customer. The customer may then retrieve the printed greeting card from the dispensing tray or bin 36.

Figure 2B:
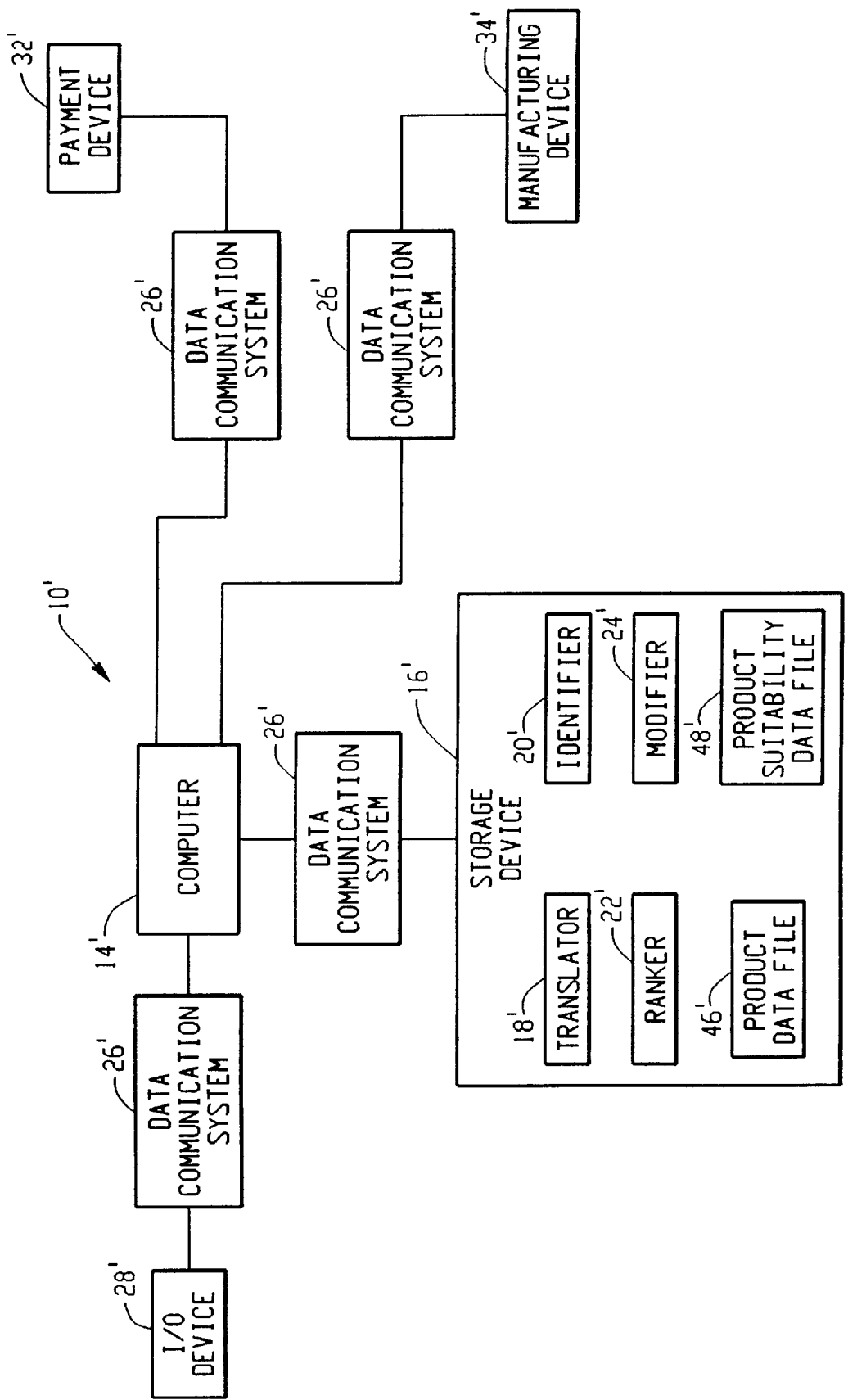
FIG. 2B is a schematic block diagram of another embodiment of a system constructed according to the principles of the present invention.

FIGS. 1 and 2A, as described above, show a system 10 that is used to vend social expression products, in particular, greeting cards. However, as explained above, while the present invention is being described with reference to a system for vending social expression products, other applications for the present invention are contemplated. For example, a system 10' that may be used to vend a variety of other products (such as photographs, motion pictures, television programs, sound recordings, gift products, literary works, and reference data) and services (such as travel services, financial services, entertainment services, and automobile registrations) is shown in FIG. 2B. (As the system and the components in FIG. 2B are substantially similar to those in FIG. 2A, the system and the components in FIG. 2B are referred to using the same reference numerals as in FIG. 2A but with a prime designation.) The system 10' is not limited to the on-site storage, retrieval, display, modification, payment, manufacture, and/or delivery of these products and services. Rather, any one or more of the components of the system 10' may be placed at locations remote from one another.

Referring in detail to FIG. 2B, the system 10' includes a computer 14' that is provided with a storage device 16' associated therewith. The computer 14' is also connected to an I/O device 28', a payment device 32', and a manufacturing device 34' (such as a printing device). The storage device 16', the I/O device 28', the payment device 32', and the manufacturing device 34' are connected to the computer 14' by means of data communication systems 26'. The data communications systems 26' allow the computer 14' to communicate with the other components of the system 10'. Such data communication systems are well known in the art and thus, will not be described in detail. Each of the components of the system 10' performs a substantially similar function as the corresponding component of the system 10. As in the system 10, the computer 14' controls the operation of the various components of the system 10'. The computer 14' may be connected, through appropriate data communication systems, to any number of storage devices, I/O devices, payment devices, manufacturing devices, and/or other computers.

Using the system 10' of FIG. 2B, a customer may select a product or service through an I/O device located in the customer's home (such as a home computer or television), pay for the selected product or service through a remote payment device (such as a credit card company's payment system), and then have the product or service transmitted to the customer's home computer or television. With such a configuration, the customer could purchase greeting cards that would be stored on a storage device associated with the customer's home computer, order a gift product that would later be mailed to the customer from a remote retail outlet, or rent a movie that would be displayed on the customer's home television. Of course, many other configurations can be envisioned using the system 10' of the present invention to enable a customer to select a variety of products and services.

B. Data Components

Before the system 10 of the present invention can be operated, a number of data files need to be developed and stored in the storage device 16 (as shown in FIG. 2A). Specifically, a product data file 46 and a product suitability data file 48 are developed and stored in the storage device 16. The layout of each of these files is described in the following paragraphs and the use of these files is described in Section C below.

An exemplary layout of the product data file 46 is illustrated in FIG. 3. The product data file 46 includes a representation 50 of each greeting card that can be vended by the system 10. The representation 50 of each greeting card is identified by an index, such as alphanumeric indices aa–zz. These representations are used to display and print the greeting cards during operation of the system 10. One of ordinary skill in the art will appreciate that the product data file 46 could also include representations of components of greeting cards. These components could be ranked based on their suitability and then assembled to form a complete greeting card.

An exemplary layout of the product suitability data file 48 is illustrated in FIG. 4. The product suitability data file 48 includes a product suitability matrix 52 corresponding to the representation 50 of each greeting card in the product data file 46. Each product suitability matrix 52 defines the purposes, needs, interests, and tastes for which its corresponding greeting card is suitable. Each product suitability matrix 52 is also identified by an index, such as alphanumeric indices aa–zz. These matrices are used to determine which greeting cards are potentially suitable for a customer's purposes, needs, interests, and tastes and to rank the greeting cards based on their suitability.

An exemplary layout of the product suitability matrix 52 is illustrated in FIG. 5. A horizontal axis 54 of the matrix 52 represents application categories relating to the greeting cards. The application categories define the groups in which the greeting cards can be classified. In the illustrated embodiment, the application categories include: (1) sending occasion or purpose, (2) relationship of recipient to sender, (3) age of recipient, (4) gender of recipient, and (5) style of message. One of ordinary skill in the art will appreciate that other application categories could be used. A vertical axis 56 of the matrix 52 represents modification categories relating to the greeting cards. The modification categories define the ways in which the greeting cards can be modified. In the illustrated embodiment, the modification categories include: (1) unmodified, (2) computer fill-in, (3) computer blanked, and (4) customer fill-in. Again, one of ordinary skill in the art will appreciate that other modification categories could be used. Elements 58 of the matrix 52 represent application descriptors relating to each greeting card. The application descriptors define the sending properties of each greeting card for each application category and for each modification category. Application descriptors for each application category might include the following:

- Sending Occasion/Purpose—Birthday, Wedding, Anniversary, New Year, Christmas, Hanukkah, Get Well, Sympathy, Congratulations, Good Luck
- Relationship of Recipient to Sender—Mother, Father, Wife, Husband, Friend, Co-Worker
- Age of Recipient—Infant, Juvenile, Adult
- Gender of Recipient—Male, Female
- Style of Message—Romantic, Sentimental, Humorous, Sarcastic FIGS. 6–8 illustrate exemplary product suitability matrices 52 for: (1) a greeting card with multiple applications that can be modified by computer fill-in, computer blanked, and customer fill-in to provide further applications (FIG. 6), (2) a greeting card with a single application, i.e., infant male birthday, that cannot be modified (FIG. 7), and (3) a greeting card with multiple applications that can be modified by computer fill-in and customer fill-in to provide further applications (FIG. 8).

C. Operation of the System

Figure 9A:
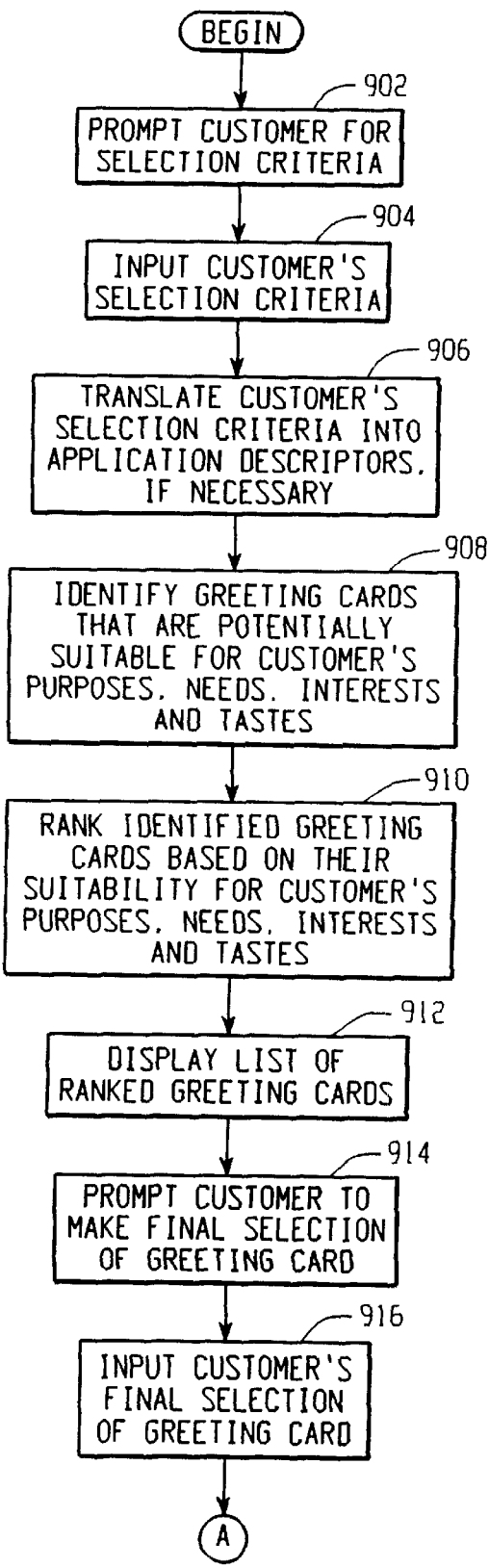
FIGS. 9A and 9B collectively are a flowchart illustrating the operation of the system of FIG. 1.
Figure 9B:
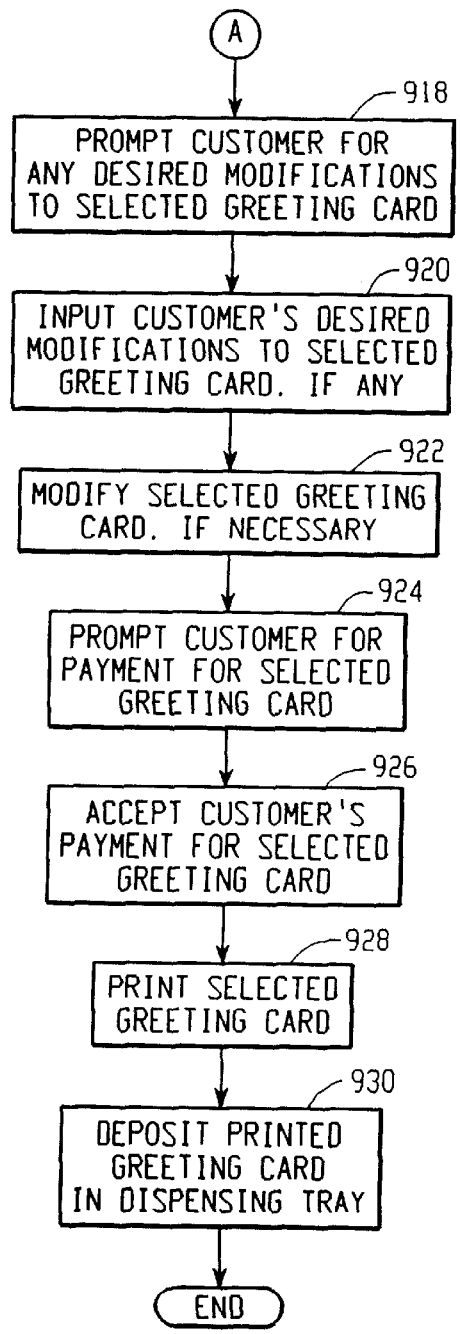

The operation of the system 10 of the present invention is illustrated in FIGS. 9A and 9B. Initially, the display device 38 prompts the customer for selection criteria relating to the type of greeting card the customer would like to purchase (step 902) and the touch screen overlay 40 inputs the customer's selection criteria (step 904). After receiving the customer's selection criteria, the computer 14 (in conjunction with the translator 18, the identifier 20, and the ranker 22) translates the criteria into application descriptors, if necessary (step 906), identifies the greeting cards that are potentially suitable for the customer's purposes, needs, interests, and tastes (step 908), and ranks the identified greeting cards based on their suitability for the customer's purposes, needs, interests, and tastes (step 910). Next, the display device 38 displays a list of the ranked greeting cards for the customer (step 912) and prompts the customer to make a final selection of a greeting card (step 914). The touch screen overlay 40 then inputs the customer's final selection of a greeting card (step 916).

Once the customer makes a final selection of a greeting card, the display device 38 prompts the customer for any desired modifications to the selected greeting card (step 918) and the touch screen overlay 40 inputs the customer's desired modifications, if any (step 920). After receiving any desired modifications, the computer 14 (in conjunction with the modifier 24) modifies the selected greeting card, if necessary (step 922). Next, the display device 38 prompts the customer for payment for the selected greeting card (step 924). The payment device 32 then accepts the customer's payment for the selected greeting card (step 926). Upon receipt of the proper payment from the customer, the printer or plotter 44 prints the selected greeting card (step 928) and then deposits the printed greeting card in the dispensing tray or bin 36 for delivery to the customer (step 930).

The step of prompting the customer for selection criteria relating to the type of greeting card the customer would like to purchase (step 902) is illustrated in greater detail in FIGS. 10–17. The display device 38 prompts the customer through a series of menu screens corresponding to each of the application categories on the horizontal axis 54 of the product suitability matrix 52 (as shown in FIG. 5).

In the illustrated embodiment, each application category has at least one corresponding menu screen. For example, one menu screen prompts the customer to input the occasion or purpose for the greeting card, as shown in FIG. 10. Another menu screen prompts the customer to input the relationship of the recipient to the sender, as shown in FIG. 11. Similar menu screens are displayed for each of the other application categories, as shown in FIGS. 12–14. One of ordinary skill in the art will appreciate that a variety of menu screens could be used to elicit the necessary selection criteria from the customer.

Additionally, some menu screens may be followed by dependent menu screens based on the response(s) to the previous menu screen(s). For example, if the customer selected "Holiday" in the occasion/purpose menu screen (FIG. 10), an additional menu screen might ask the customer to input a particular holiday for the greeting card, as shown in FIG. 15. Likewise, if the customer selected "Relative" in the relationship of recipient menu screen (FIG. 11), an additional menu screen might ask the customer to input a particular type of relative, as shown in FIG. 16.

The dependent menu screens may continue until the customer has provided sufficiently detailed selection criteria. For example, if the customer selected "Parent" in the particular type of relative menu screen (FIG. 16), an additional menu screen might ask the customer to input a particular parent, as shown in FIG. 17.

At each menu screen, the customer has the option of selecting no criteria for the application category corresponding to the menu screen. If the customer chooses not to enter any criteria for a given application category, that category will not be used in ranking the suitability of the greeting cards for the customer.

In a preferred embodiment of the present invention, the terms used as selection criteria in the menu screens do not have to correspond exactly to the terms used as application descriptors in the product suitability matrices. Rather, a different set of terms may be used in the menu screens and in the product suitability matrices. As was stated above and is described in greater detail below, if a different set of terms is used, the customer's selection criteria must be translated into application descriptors. In order to eliminate the translation step, an alternative embodiment of the present invention uses the same set of terms in the menu screens and in the product suitability matrices.

The step of translating the customer's selection criteria into application descriptors, if necessary (step 906) is illustrated in greater detail in FIG. 18. Initially, the translator 18 determines which of the customer's selection criteria need to be translated (step 1802). This determination is based on which of the customer's selection criteria do not correspond to the set of terms used as application descriptors in the product suitability matrices. Next, the translator 18 searches for each of the customer's selection criteria that needs to be translated in a correlation lexicon (step 1804). In the illustrated embodiment, the correlation lexicon is a table that correlates each of the possible customer selection criteria that does not correspond to the set of terms used as application descriptors in the product suitability matrices with the appropriate corresponding application descriptors. An exemplary correlation lexicon is illustrated in FIG. 19. Using the exemplary correlation lexicon, if the customer entered "Male Relative," the correlation lexicon would translate the selection criteria into "Son or Father or Brother or Grandfather or Uncle." The correlation lexicon must contain an entry for each of the possible customer selection criteria that does not correspond to the set of terms used as application descriptors in the product suitability matrices. When the translator 18 finds each of the customer's selection criteria that needs to be translated in the correlation lexicon, the translator replaces the criteria with the corresponding application descriptors from the correlation lexicon (step 1806).

Figure 20:
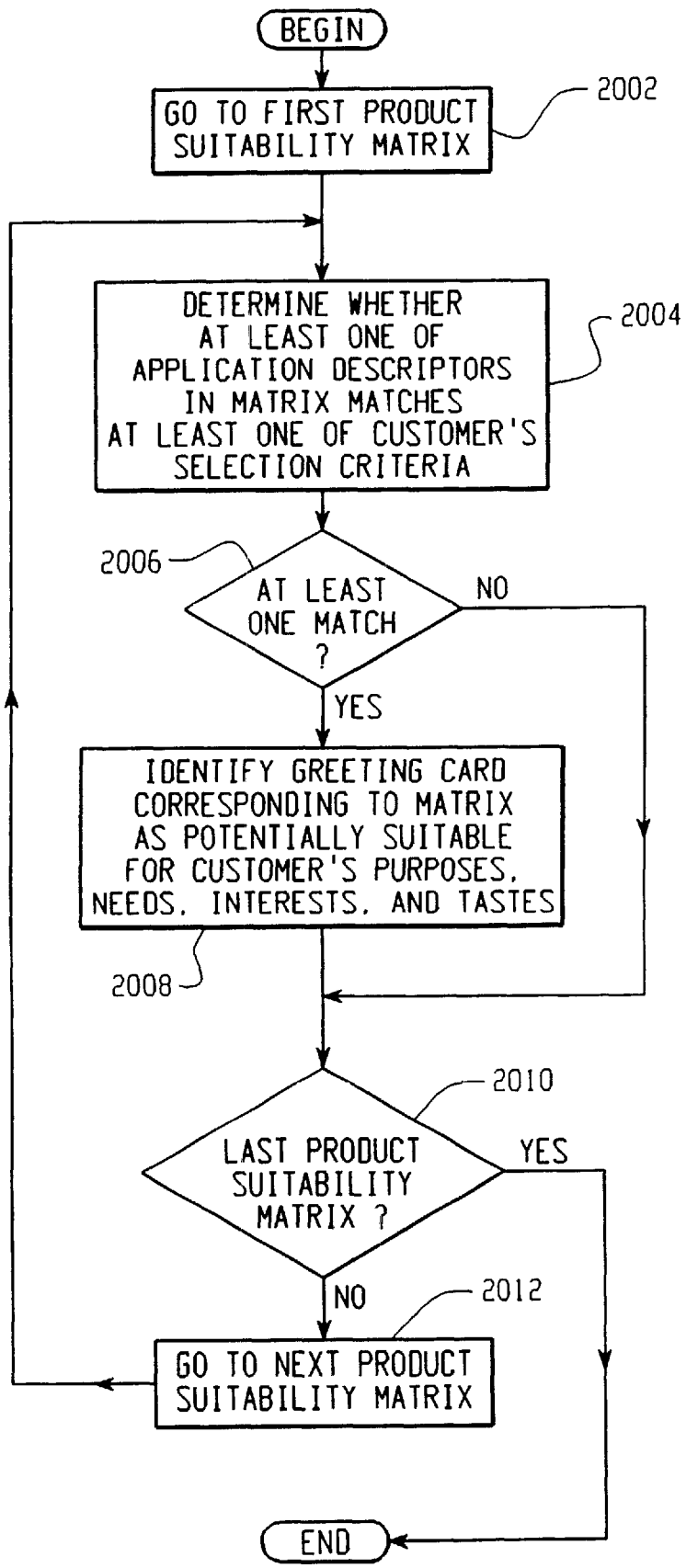
FIG. 20 is a flowchart illustrating an identification step of FIGS. 9A and 9B in greater detail.

The step of identifying the greeting cards that are potentially suitable for the customer's purposes, needs, interests, and tastes (step 908) is illustrated in greater detail in FIG. 20. Starting with the first product suitability matrix (step 2002), the identifier 20 determines whether at least one of the application descriptors in the matrix matches at least one of the customer's selection criteria (step 2004). If at least one of the application descriptors matches at least one of the customer's selection criteria (step 2006), the identifier 20 identifies the greeting card corresponding to the product suitability matrix as potentially suitable for the customer's purposes, needs, interests, and tastes (step 2008). The identifier 20 repeats this process for each product suitability matrix (steps 2010 and 2012).

Figure 21:
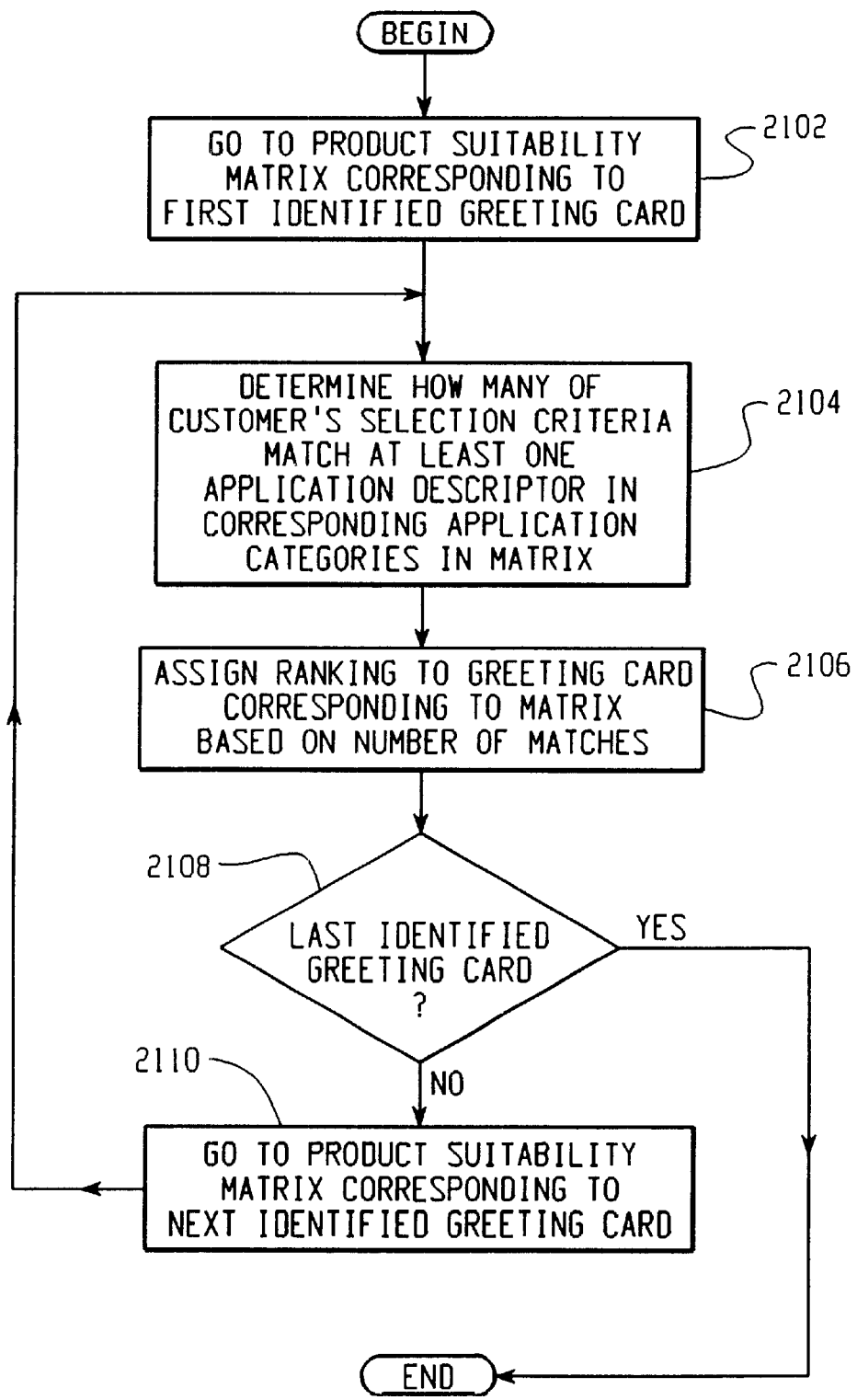
FIG. 21 is a flowchart illustrating a first scheme implementing a ranking step of FIGS. 9A and 9B in greater detail.
Figure 22:
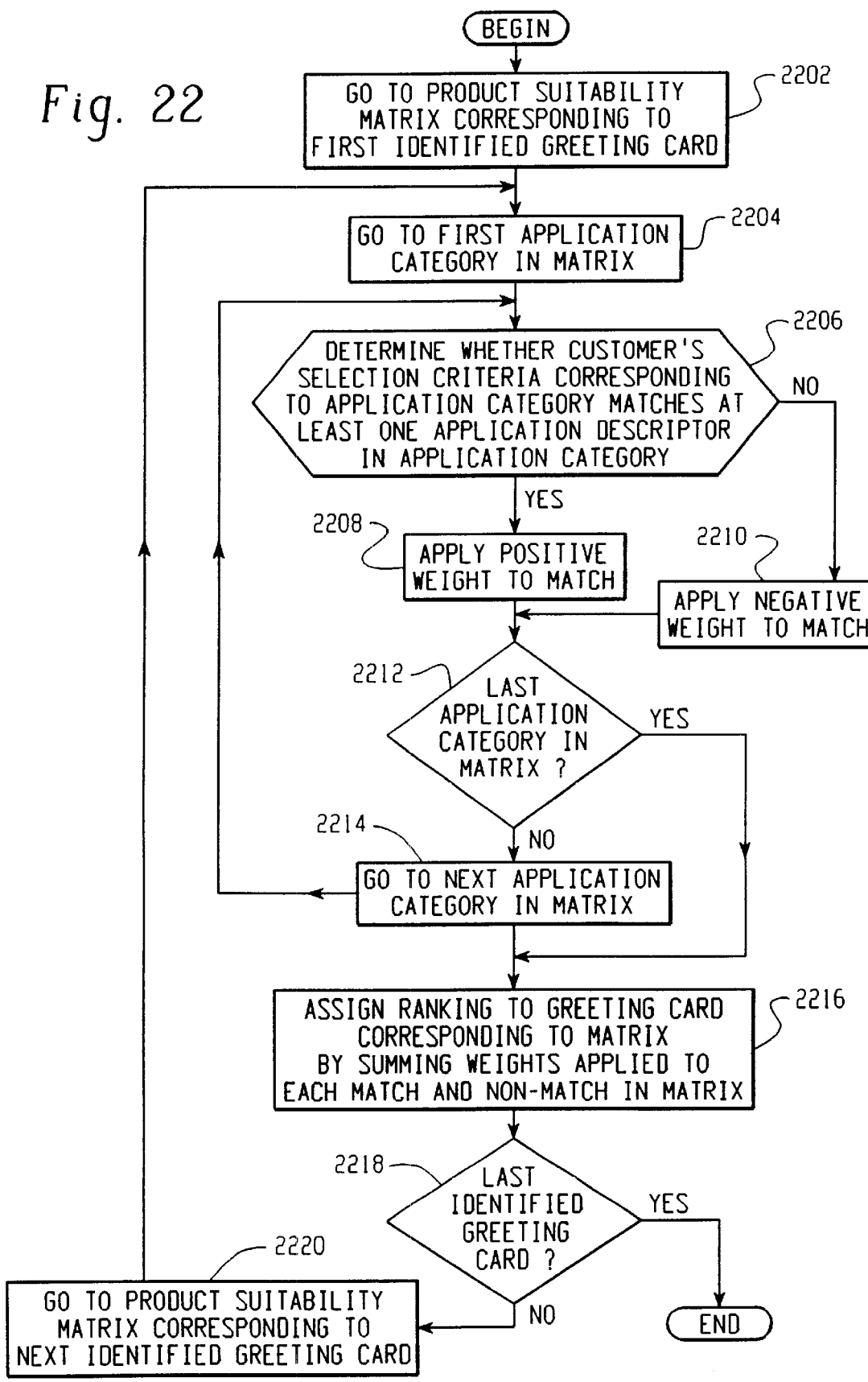
FIG. 22 is a flowchart illustrating a second scheme implementing the ranking step of FIGS. 9A and 9B in greater detail.

The step of ranking the identified greeting cards based on their suitability for the customer's purposes, needs, interests, and tastes (step 910) is now described in greater detail. Generally, the ranker 22 assigns a ranking to each greeting card that was identified as being potentially suitable for the customer based on the matches between the customer's selection criteria and the application descriptors in the product suitability matrix corresponding to the identified greeting card. Two specific ranking schemes are illustrated in FIGS. 21 and 22. The first scheme (FIG. 21) assigns a ranking to each identified greeting card based on the number of matches between the customer's selection criteria and the application descriptors in the product suitability matrix corresponding to the identified greeting card. The second scheme (FIG. 22) assigns a ranking to each identified greeting card based on the matches and non-matches between the customer's selection criteria and the application descriptors in the product suitability matrix corresponding to the identified greeting card and the importance of a match or non-match in each application category. While two specific ranking schemes are illustrated here, one of ordinary skill in the art will appreciate that many other ranking schemes could be used.

Referring to the first ranking scheme as shown in FIG. 21, starting with the product suitability matrix corresponding to the first greeting card that was identified as being potentially suitable for the customer (step 2102), the ranker 22 determines how many of the customer's selection criteria match at least one application descriptor in the corresponding application categories in the matrix (step 2104). Depending on how many of the customer's selection criteria match at least one application descriptor in the corresponding application categories, the ranker 22 assigns a ranking to the greeting card corresponding to the product suitability matrix based on the following (step 2106):

| Ranking | Necessary Match |
| --- | --- |
| 1 | All of the customer's selection criteria must match at least one application descriptor in the corresponding application categories, excluding all modification categories (i.e., computer fill-in, computer blanked, and customer fill-in) and the customer must have entered at least one selection criteria for each application category |
| 2 | Same as 1, but including computer modification categories (i.e., computer fill-in and computer blanked) |
| 3 | Same as 1, but including customer modification category (i.e., customer fill-in) |
| 4 | All of the customer's selection criteria must match at least one application descriptor in the corresponding application categories, excluding all modification categories, even though the customer did not enter at least one selection criteria for each application category |
| 5 | Same as 4, but including computer modification categories |
| 6 | Same as 4, but including customer modification category |
| 7 | n-1 of the customer's selection criteria must match at least one application descriptor in the corresponding application categories, excluding all modification categories, regardless of whether the customer entered at least one selection criteria for each application category (the non-match is preferably a non-match in a predetermined application category, but alternatively, could be a non-match in any application category) |
| 8 | Same as 7, but including computer and customer modification categories |
| 9 | n-2 of the customer's selection criteria must match at least one application descriptor in the corresponding application categories, excluding all modification categories, regardless of whether the customer entered at least one selection criteria for each application category (the non-matches are preferably non-matches in predetermined application categories, but alternatively, could be non-matches in any application categories) |
| 10 | Same as 9, but including computer and customer modification categories |
| ... | |
| m-3 | 2 of the customer's selection criteria must match at least one application descriptor in the corresponding application categories, excluding all modification categories, regardless of whether the customer entered at least one selection criteria for each application category (the non-matches are preferably non-matches in predetermined application categories, but alternatively, could be non-matches in any application categories) |
| m-2 | Same as (m-3), but including computer and customer modification categories |
| m-1 | 1 of the customer's selection criteria must match at least one application descriptor in the corresponding application category, excluding all modification categories, regardless of whether the customer entered at least one selection criteria for each application category (the non-matches are preferably non-matches in predetermined application categories, but alternatively, could be non-matches in any application categories ) |
| m | Same as (m-1), but including computer and customer modification categories | where "n" is the smaller of (the number of application categories in the product suitability matrix and the number of selection criteria entered by the customer, as translated), "1" is the highest ranking, and "m" is the lowest ranking. The ranker 22 repeats this process for each product suitability matrix corresponding to a greeting card that was identified as being potentially suitable for the customer (steps 2108 and 2110).

A variation of the first ranking scheme might determine the number of matches between the customer's selection criteria and the application descriptors in the product suitability matrices corresponding to all of the greeting cards. Then, the greeting card(s) having the highest number of matches (p) would be assigned the highest ranking, the greeting card(s) having (p−1) matches would be assigned the second highest ranking, the greeting card(s) having (p−2) matches would be assigned the third highest ranking, and so on. Sub-rankings could be assigned within these rankings based on the particular matches and non-matches for each greeting card.

Referring to the second ranking scheme as shown in FIG. 22, starting with the first application category in the product suitability matrix corresponding to the first greeting card that was identified as being potentially suitable for the customer (steps 2202 and 2204), the ranker 22 determines whether the customer's selection criteria corresponding to the application category matches at least one application descriptor in the application category (step 2206). If the customer's selection criteria matches at least one application descriptor, the ranker 22 applies a positive weight to the match (step 2208); otherwise, the ranker applies a negative weight to the non-match (step 2210). The determination of the weights to be applied to each match and non-match is described in greater detail below. The ranker 22 repeats this process for each application category in the matrix (steps 2212 and 2214). The ranker 22 then assigns a ranking to the greeting card corresponding to the product suitability matrix by summing the weights applied to each match and non-match in the matrix (step 2216). The lower the sum of the weights, the higher the ranking for the greeting card. The ranker 22 repeats this process for each product suitability matrix corresponding to a greeting card that was identified as being potentially suitable for the customer (steps 2218 and 2220).

The weights applied to each match and non-match between the customer's selection criteria and the application descriptors (steps 2208 and 2210) may be provided by the system designer, the system owner, or the customer. If the weights are provided by the system designer, the weights are stored in a file (not shown) in the storage device 16 for use by the ranker 22. If the weights are provided by the system owner or the customer, the display device 38 prompts the system owner or the customer through a menu screen to input the importance of a match or non-match in each application category (i.e., the positive or negative weight to be applied to each match or non-match in each application category) in determining and ranking the suitability of the greeting cards for the customer, as shown in FIG. 23. The touch screen overlay 40 then inputs the customer's selections and the weights are stored in the file in the storage device 16 for use by the ranker 22. If the weights are provided by the customer (as opposed to the system designer or the system owner), the ranking process can be better suited to the particular purposes, needs, interests, and tastes of the customer.

The step of displaying a list of the ranked greeting cards for the customer (step 912) is now described in greater detail. Initially, the computer 14 determines which of the ranked greeting cards to display. This determination is based on the ranking assigned to each potentially suitable greeting card. A number of schemes may be employed for determining which of the ranked greeting cards to display. In a simple scheme, all of the ranked greeting cards are displayed starting with the highest ranked greeting card and continuing down to the lowest ranked greeting card. However, in order to facilitate the customer's final selection of a greeting card, only a subset of the ranked greeting cards is preferably displayed. For example, the ten highest ranked greeting cards may be displayed. Then, as the customer desires to view additional cards, the next ten highest ranked greeting cards may be displayed. Alternatively, ten greeting cards randomly chosen from the twenty highest ranked greeting cards may be displayed. One of ordinary skill in the art will appreciate that many schemes could be developed for choosing a subset of the ranked greeting cards to display for the customer. After the computer 14 determines which of the ranked greeting cards to display, the display device 38 displays the list of chosen ranked greeting cards for the customer.

One of ordinary skill in the art will now appreciate that the preferred embodiment of the present invention provides a method and system for vending products where the customer is guided through an interactive process that receives selection criteria from the customer relating to the type of product the customer would like to purchase and uses the customer's selection criteria to determine which products are potentially suitable for the customer's purposes, needs, interests, and tastes and to rank the products based on their suitability to facilitate the customer's final selection of a product.

What is claimed is:

1. A method for selecting an electronic greeting card from a plurality of electronic greeting cards stored in a database, comprising the steps of:

providing a greeting card suitability data record for each of the greeting cards stored in the database, each greeting card suitability data record including a plurality of application descriptors associated with one or more application categories, wherein the application descriptors describe the suitability of a particular greeting card in each of the application categories, and wherein each application category in the product suitability data record may be associated with one or more application descriptors;

providing one or more user-specified selection criteria that describe the type of greeting card being sought by a user; and selecting one or more suitable electronic greeting cards from the database by searching the greeting card suitability data records and comparing the user-specified selection criteria with the plurality of application descriptors for each greeting card in the database.

2. The method of claim 1, wherein the greeting card suitability data records are structured as a suitability matrix.

3. The method of claim 2, wherein the suitability matrices include two dimensions, one dimension that describes the one or more application categories for the greeting card and a second dimension that describes one or more modification categories for the greeting card.

4. The method of claim 3, wherein the modification categories define the ways in which the greeting cards can be modified by the user.

5. The method of claim 1, wherein the user-specified selection criteria are input by the user.

6. The method of claim 1, wherein the user-specified selection criteria are selected by the user.

7. The method of claim 1, wherein the user-specified selection criteria are associated with the one or more application categories.

8. The method of claim 1, wherein the application categories include: an occasion category, a relationship category, and a style category.

9. The method of claim 8, wherein the application categories further include: an age category, and a gender category.

10. The method of claim 1, wherein the greeting card suitability data records are stored in the database.

11. The method of claim 1, further comprising the step of translating the user-specified selection criteria into one or more application descriptors.

12. The method of claim 11, wherein the translating step further comprises the steps of:
identifying which user-specified selection criteria do not match at least one of the plurality of application descriptors; and
for those user-specified selection criteria that do not match, searching a correlation lexicon to find the non-matching user-specified selection criteria, and once found, replacing the user-specified selection criteria with one or more application descriptors stored in the correlation lexicon that are associated with the particular selection criteria.

13. The method of claim 12, wherein the correlation lexicon is a look up table stored in the database.

14. The method of claim 1, wherein the selecting step further comprises the steps of:
for each electronic greeting card, determining the number of matches between the one or more user-specified selection criteria and the application descriptors associated with the particular greeting card; and
ranking the greeting cards based on the number of matches.

15. The method of claim 14, wherein the ranking step further includes the steps of:
applying a weighting scale to the application categories;
for each match, associating a weight with the match depending upon the application category with which the particular application descriptor is associated; and
calculating a ranking for each greeting card based on the number of matches and the associated weights for each match.

16. The method of claim 15, wherein the weights are supplied by the user.

17. The method of claim 1, further comprising the step of: displaying an image of the selected greeting cards to the user.

18. The method of claim 17, further comprising the step of: the user further selecting at least one of the displayed selected greeting cards for purchase.

19. The method of claim 18, further comprising the step of: the user modifying the selected greeting card prior to purchase.

20. The method of claim 1, wherein the database of electronic greeting cards is located remotely from the user.

21. The method of claim 1, wherein the application categories define groups into which the greeting cards can be classified.

22. A data record search and retrieval method, comprising the steps of:
providing a plurality of data records stored in a database;
providing a data record suitability data file associated with the data records stored in the database, the data record suitability data file including a plurality of data record descriptors associated with one or more data record application categories, wherein the data record descriptors describe the suitability of a particular data record in each of the data record application categories;
providing one or more user-specified selection criteria in each of the data record application categories;
searching the data record suitability data file and ranking the data records based on the number of matches between the user-specified selection criteria and the application descriptors for each application category; and
retrieving the highest ranked data records.

23. The method of claim 22, wherein the data record descriptors are organized within the data record suitability data file as a plurality of suitability matrices, each suitability matrix being associated with a particular data record.

24. The method of claim 22, wherein the data records are electronic greeting cards.

25. The method of claim 22, further comprising the step of translating the user-specified selection criteria into one or more data record descriptors.

26. The method of claim 25, wherein the translating step further comprises the steps of:
identifying which user-specified selection criteria do not match at least one of the plurality of data record descriptors; and
for those user-specified selection criteria that do not match, searching a correlation lexicon to find the non-matching user-specified selection criteria, and once found, replacing the user-specified selection criteria with one or more data record descriptors stored in the correlation lexicon that are associated with the particular selection criteria.

27. The method of claim 22, wherein the ranking step further includes the steps of:
applying a weighting scale to the data record application categories;
for each match, associating a weight with the match depending upon the data record application category with which the particular data record descriptor is associated; and
calculating a ranking for each data record based on the number of matches and the associated weights for each match.

28. The method of claim 22, wherein the data records are electronic products.

29. A search and retrieval method, comprising the steps of:
providing a plurality of data records;
providing a data record suitability data file associated with the data records, the data record suitability data file including a plurality of data file descriptors that describe the suitability of the data records for a particular application category;
providing user-specified selection criteria within each application category for retrieving a particular type of data record;
providing a weighting scale for the application categories, wherein the weighting scale describes the importance placed by the user on particular application categories;
searching the data record suitability data file and identifying the most relevant data records by determining the number of matches between the user-specified selection criteria and the data file descriptors, wherein each match has an associated weight depending on the application category with which the particular data record descriptor is associated, and ranking the data records based on the number of matches and the associated weight for each match; and retrieving the most relevant data records based on the ranking.

30. A method for vending electronic products, the method comprising:

storing the electronic products in a product data file;

providing a product suitability data file that includes a plurality of application descriptors, wherein the application descriptors define the properties of each electronic product for at least one application category, each application category defining groups into which the electronic products can be classified;

presenting, to a user, selection criteria options for a plurality of application categories;

receiving at least one selection criteria from the user for each application category presented;

searching the product suitability data file to find the most relevant electronic products based upon the user provided selection criteria;

ranking the products based on matches between the received selection criteria and the application descriptors for each product; and displaying a list of the ranked products for selection of a product by the user.

* * * * *